United States Patent [19]
Persicke et al.

[11] 3,910,565
[45] Oct. 7, 1975

[54] SHOCK ABSORBERS

[75] Inventors: Gunter Persicke, Dartford; James Richard Child, Wooton-under-Edge, both of England

[73] Assignee: Road Research Limited, Gravesend, England

[22] Filed: Mar. 13, 1974

[21] Appl. No.: 450,906

[30] Foreign Application Priority Data
Mar. 19, 1973 United Kingdom............... 13086/73

[52] U.S. Cl................... 267/116; 267/65 R; 293/70
[51] Int. Cl.²............................................ F16F 9/18
[58] Field of Search.......... 267/65 R, 35, 64 R, 116, 267/139; 293/DIG. 1, DIG. 2, 60, 70, 86, 85, 1; 188/288

[56] References Cited
UNITED STATES PATENTS

| | | | |
|---|---|---|---|
| 2,808,070 | 10/1957 | Malsbary | 267/35 |
| 3,853,311 | 12/1974 | Kreuzer | 293/70 |

FOREIGN PATENTS OR APPLICATIONS

| | | | |
|---|---|---|---|
| 1,375,269 | 9/1964 | France | 269/65 |

*Primary Examiner*—James B. Marbert
*Attorney, Agent, or Firm*—Karl W. Flocks

[57] ABSTRACT

A shock absorber comprising a cylinder element, a liner element disposed within the cylinder element, and a piston element within the liner element and moveable longitudinally with respect to the cylinder element under the influence of fluid pressure within the cylinder element, the liner element having longitudinally thereof at least one zone of weakness yieldable at a predetermined pressure of the fluid to permit fluid to flow past the piston element and thus vary the rate of movement of the piston element with respect to the cylinder element.

In one preferred construction two concentric liners are used one within the other inside the cylinder element, one liner being that having a zone of weakness and the other having a longitudinal slot therein co-operating with the said zone of weakness in the first named liner.

12 Claims, 2 Drawing Figures

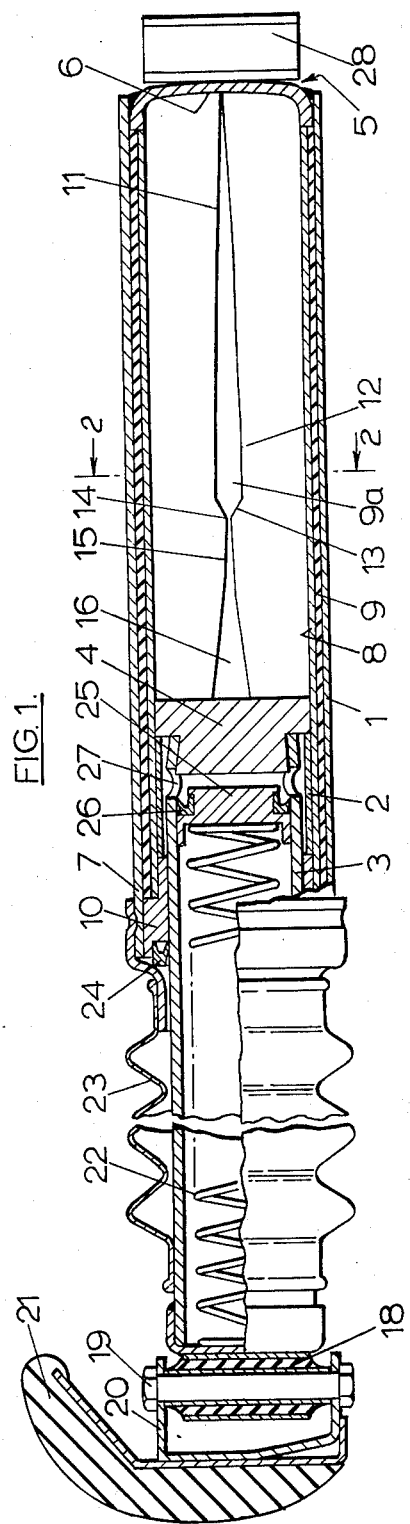
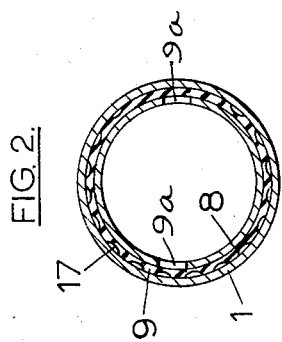

SHOCK ABSORBERS

BACKGROUND OF THE INVENTION

1. Field of the Invention

This invention relates to shock absorbers for use in machinery, motor land vehicles, highway guard rail supports and for other purposes where vibrations or shocks on members are to be damped or absorbed.

2. Description of Prior Art

Known shock absorbers comprise telescopic members including damping devices such as springs and/or hydraulic or pneumatic piston and cylinder means which normally absorb shocks by yielding uniformly under a steadily applied shock or on an impact force, but in many cases it is desirable to vary the resistance to a shock or impact force particularly when the force to be absorbed is on a vehicle bumper bar or highway guard rails attached to yieldable upright supports.

SUMMARY

According to the present invention a shock absorber comprises a cylinder element, a liner element disposed within the cylinder element, and a piston element within the liner element and moveable longitudinally with respect to the cylinder element under the influence of fluid pressure within the cylinder element, the liner element having longitudinally thereof at least one zone of weakness yieldable at a predetermined pressure of the fluid to permit fluid to flow past the piston element and thus vary the rate of movement of the piston element with respect to the cylinder element.

Preferably the liner element comprises an assembly of two liners one within the other, the first liner having a longitudinally directed slot therein and the second liner having at least a zone of weakness such that the fluid will flow through the slot to pass the piston element and at said predetermined pressure the second liner will yield to vary the cross sectional area of said fluid flow path past the piston element.

The slot in the first liner may be of any desired configuration to provide at any point along the first liner a predetermined fluid flow rate therethrough which with the zone of weaker pressure resistance in the second liner will fulfill the predetermined characteristics of the shock absorber. These characteristics of the absorber are determined by its use and the forces to be absorbed during operation of the shock absorber: these characteristics are functions inter alia of the temperature range within which the shock absorber is to operate, the size of the forces to be absorbed normally expressed in terms of the value of the fluid pressure within the cylinder element, the type and stability of the fluid employed in the cylinder, the materials from which the element and liners are made and their coefficients of expansion, the time within which the forces are to be absorbed and the length of stroke of the piston element movement within the cylinder element in absorbing said forces.

In this Specification the term "fluid" is used to mean a liquid such as an oil, e.g. buffer oil, or a semi-solid flowable material such as a siliconised rubber or synthetic plastics material, or a gas which on displacement of the piston element within the cylinder element will flow along said flow path as in the case of a semi-solid material by granulation and becoming flowable while the remainder may remain compressible by the piston element within the cylinder element.

The longitudinal slot in the first liner element starting at the piston end may be formed with tapered sides coming down at about one third the way along the length of movement of the piston to a very fine gap and then widening abruptly and thereafter closing by converging slot sides to zero position at the end of the cylinder opposite the piston element.

In another embodiment the longitudinal slot in the first liner element has at its end remote from the cylinder head a parallel sided form generally longitudinally of the cylinder and the main portion of the slot varies in cross section from the parallel portion to its end adjacent the cylinder head. The criterion of the shape of this slot is at each point along its length to provide under the conditions e.g. temperatures and pressures prevailing the desired resistance to relative movement between the piston and cylinder.

The first liner may be of any substantially rigid material such as metal e.g. steel or aluminum or synthetic plastics material such as polytetrafluoroethylene.

The second liner may be of any yieldable material, the term "yieldable" being used herein to include any material which may be deformable, resilient and elastic providing that when it has changed its shape under the influence of pressure in the cylinder element, it will return or restore itself to its original shape and condition when the said pressure falls below that which resulted in its deformation.

The second liner of yieldable material may be one which has a substance which can yield at the predetermined pressure at a point where the fluid pressure is applied to it through the slot in the first liner; this second liner may be of sponge rubber or other material such for example as a tube of yieldable material on the outside of which there are a number of areas in which the substance has been removed to form recesses so that the thickness of the liner at those points is weakened enabling it to yield under the fluid pressure passing through the slot in the first liner. These cutaway portions or other zones of weakening may be at selected areas round the liner and/or along the liner so that at any point in the stroke of the piston element within the liners and cylinder element the appropriate rate of flow of the fluid from one side of the piston element to the other is such as to impart at that point to the shock absorber the characteristics required.

Any suitable material having the aforesaid characteristics may be employed for the second liner, such as rubber, synthetic rubber, polyvinyl chloride, polyethylene, or polyurethane, or a composition or laminations of all such materials or two or more of them, and may be in sheet form, tubular form or moulded to the desired dimensions and it may be the solid or foamed form of any such materials providing it is yieldable.

The piston element is preferably hollow and a fluid path is preferably provided past the piston element including a groove, aperture or the like in the piston to permit fluid to flow through the liner element slot into the hollow interior of the piston from the hollow interior of the cylinder and vice versa.

A cover may be provided round the piston element in communication with the piston element and/or cylinder element interior to provide an additional fluid reservoir.

BRIEF DESCRIPTION OF THE DRAWINGS

FIG. 1 is a cross-section through a shock absorber;

FIG. 2 shows a cross section on the line II—II of FIG. 1 looking in the direction of the arrows.

Referring to the drawings, these show a shock absorber used for example as forming part of the support of a road vehicle bumper assembly.

DESCRIPTION OF PREFERRED EXAMPLES

This shock absorber has a cylinder element 1 and a piston element 2, the latter being in the form of a tube 3, with closed ends, the inner end closure 4 forming a piston head. One end 5 of the cylinder element is closed by a member 6 and the tubular piston element extends out of the other end 7 of the cylinder element. The cylinder element has a liner assembly formed of a first liner 8 and a second liner 9 interposed within the cylinder element between the liner 8 and the wall of the cylinder element. The first liner may be made of any substantially rigid material such as metal e.g. steel or aluminium or synthetic plastics material e.g. polytetrafluoroethylene.

The liner 8 has a slot 9a which provides a fluid flow path for fluid in the cylinder element to flow past the piston element head 4 into the portion of the cylinder element 10 on the opposite side of the piston. The cross section of this slot is calibrated to give at any particular position of the piston element in its stroke within the cylinder element a rate of flow of the fluid past the head 4 so as to control the movement of the piston element with respect to the cylinder element in accordance with the required characteristics of the shock absorber.

The slot 9a may vary in width over its length and it may extend over part or whole of the portion of the piston element forming the stroke of the head 4.

In the drawing the slot 9a starts at the end 5 or near the end 5 from a solid part of the liner wall and then extends with a taper 11, the taper getting less until the sides of the slot are substantially parallel at 12; from the portion 12 the slot narrows abruptly at 13 to a tiny throat 14 and thereafter diverges at 15 and with a widening divergence at 16 until it reaches the head 4 of the piston.

In an alternative form of the slot it could be parallel sided over a substantial portion of its length and then taper at one or both of its ends. The shape of the slot depends entirely on the characteristics required of the shock absorber.

The second liner 9 is disposed between the liner 8 and the cylinder wall as a free fit but preferably as a sliding fit between the liner 8 and the wall. This liner is of a material capable of yielding under the fluid pressure applied to it from the interior of the cylinder element through the slot in the liner 8.

This second liner 9 has a zone or zones of weakness over part or all of its length and that zone of weakening preferably includes a portion which does register with part or the whole of the slot over its length.

As shown in the drawings, the line 9 is made of a yieldable material such as rubber, synthetic rubber, poly-vinyl chloride, polyethylene, polyurethane or a combination or series of laminations of such materials or two or more of them and may be in sheet form, tubular form or moulded to the desired dimensions. The liner 9 may be solid material or a foamed material providing that it is yieldable. In FIG. 2 it can be seen that the liner 9 is provided with recesses 17 round its periphery which may be moulded in it or cut or ground from it. These recesses 17 may be over a portion of the circumferential area of the liner and over a part or whole of its length or over a greater portion of the circumference and/or length. These recesses are shown in FIG. 2 as of the same shape and dimensions but they may vary in shape and/or dimension and may be deeper or less deep in the thickness of the liner. If desired some of the recesses or all the recesses may extend right through to form apertures in the liner or they may have small apertures at the base for communication with the interior of the cylinder element.

The end of the piston element remote from the head 4 is provided with a mounting 18 by which it may be bolted as by a pivot bolt 19 to a bracket 20 fast with the bumper 21 assembly of a motor vehicle or other article on which shocks are to be absorbed such as the rail of a guard rail mounted alongside roadways.

Within the piston element 3 a spring 22 is mounted so that when the piston element has moved into the cylinder element the spring 22 on reasserting itself by removal of the compressive force will return the piston to its original position, the fluid in the chamber 10 of the piston element flowing back through the slot into the interior of the piston element itself.

A cover 23 may be placed over the piston element to keep out unwanted dirt and other material from engaging the sliding surfaces of the piston element.

A seal 24 is provided between the end of the cylinder element and tubular portion 3 of the piston element to prevent the egress of the pressure fluid from the assembly.

Within the piston element there may be a further piston head 25 sealed by sealing means 26 within the tubular part of the piston element and the space between the head 25 and the head 4 communicates through apertures 27 with the chamber 10 so that as the piston element moves along inside the cylinder element compressing the fluid in the latter, the fluid will not only follow the slot forming its fluid path into the chamber 10, but fluid will also flow through the aperture 27 and force the head 25 to compress the spring 22 thus increasing the resistance to compression of the whole shock absorber.

In operation with low forces on the working fluid in the cylinder element which may be oil, there will not be much deflection of the liner 9 so that the slot in the liner 8 being of predetermined shape will control the flow of fluid past the piston head 4 and thus give the required shock absorber characteristics to the device. At higher forces within the pressure fluid the internal pressure within the cylinder element forces through the slot in the liner 8 and causes the liner 9 to expand by a predetermined amount dependent upon the elasticity or yieldability and the form of the recesses 17 in the liner 9 thereby effectively increasing the bore of the cylinder and therefore the size of the oil control orifice formed by the portion of the slot in the liner 8 alongside the piston head 4. The larger the orifice the greater the reduction in the internal pressure in the cylinder element so setting up a new force/stroke characteristic of the system which combines the effect of the liner orifice and the expansion of the yieldable liner 9. At extreme high forces, the fluid pressure is very high and the expansion of the line 9 can increase the fluid control orifice so much that the force/stroke characteristic is dependent mainly on the expansion of the liner 9.

In the construction of a vehicle bumper assembly two of the aforesaid shock absorbers are mounted on the vehicle at either side of the chassis and at their inner ends 5 each shock absorber has a bearing 28 by which the shock absorber may be pivotally mounted on a chassis or other element fast with the vehicle. It will thus be seen that the axes of the pin 19 and the bearing 28 will be vertical thereby permitting substantially stiff mounting for the vehicle bumper in the vertical position but permitting some slight movement horizontally.

It will be understood that the aforesaid constructions are exemplary only of the invention and the shape and cross sectional area of the slot and/or liner aperture may be designed to suit the required characteristics of the shock absorber at each point of its displacement under load within the cylinder and/or liner. The portion of reduced cross sectional area of the liner and the liner aperture may be in the form of one or more slots or other areas of reduced cross sectional area within the liner cross section, or the slot may have wide and narrow portions in any suitable configuration to provide the characteristic required by the absorber.

We claim:

1. A shock absorber comprising a cylinder element, a liner arrangement disposed within said cylinder element, a piston element within said liner arrangement and moveable longitudinally therein, at least one zone 9a of weakness longitudinally disposed within said liner arrangement and yieldable at a predetermined pressure, and a fluid in shock absorbing relationship within said cylinder element and liner arrangement such that on the application of the force of shock on at least one of said piston and cylinder elements said elements will be relatively displaced and at said predetermined pressure said zone will yield to permit fluid to flow past said piston to permit variation in the rate of absorption of said force.

2. A shock absorber according to claim 1 wherein said liner arrangement comprises an assembly of two liners one within the other, one of said two liners having a longitudinally directed slot therein and the other of said two liners having said zone of weakness permitting on yielding at said predetermined pressure fluid to flow past said piston element in said slot.

3. A shock absorber according to claim 1 wherein said liner arrangement comprises an assembly of two liners one within the other, one of said two liners having a longitudinally directed slot therein and the other of said two liners having said zone of weakness permitting on yielding at said predetermined pressure fluid to flow past said piston element in said slot, said slot having a transverse cross section at all points in its length calculated from said shock absorber characteristics to provide a predetermined varying resistance to shock during relative movement between the piston and cylinder elements.

4. A shock absorber according to claim 1 wherein said liner arrangement comprises an assembly of two liners one within the other, one of said two liners having a longitudinally directed slot therein and the other of said two liners having said zone of weakness permitting on yielding at said predetermined pressure fluid to flow past said piston element in said slot, said slot from the piston end has a tapered side for about one third of its length ending in a fine gap and then widening abruptly and thereafter narrowing to its end adjacent the end of the cylinder element.

5. A shock absorber according to claim 1 wherein said liner arrangement comprises an assembly of two liners one within the other, one of said two liners having a longitudinally directed slot therein and the other of said two liners having said zone of weakness permitting on yielding at said predetermined pressure fluid to flow past said piston element in said slot, said slot at its piston end having parallel sides longitudinally of the cylinder and then varying in width to its other end.

6. A shock absorber according to claim 1 wherein said liner arrangement comprises an assembly of two liners one within the other, one of said two liners having a longitudinally directed slot therein and the other of said two liners having said zone of weakness permitting on yielding at said predetermined pressure fluid to flow past said piston element in said slot, said one of said two liners being of metal, e.g. selected from steel and aluminum.

7. A shock absorber according to claim 1 wherein said liner arrangement comprises an assembly of two liners one within the other, one of said two liners having a longitudinally directed slot therein and the other of said two liners having said zone of weakness permitting on yielding at said predetermined pressure fluid to flow past said piston element in said slot, said one of said two liners being of synthetic plastics material such as polytetrafluoroethylene.

8. A shock absorber according to claim 1 wherein said yieldable zone of said liner arrangement comprises a tube of yieldable material having on its exterior surface a number of spaced recesses and is selected from sponge rubber, synthetic rubber, rubber, polyvinyl chloride, polyethylene, polyurethane, a lamination of at least two of such substances and a composition of at least two of such substances.

9. A shock absorber according to claim 1 wherein said yieldable zone of said liner arrangement comprises a form selected from sheet form, tubular form and moulded to predetermined dimensions.

10. A shock absorber according to claim 1 wherein said piston element has a hollow interior and a fluid path is provided past the piston element including a duct through the piston element into the hollow piston interior.

11. A shock absorber according to claim 1 wherein a cover is provided round the portion of the piston element outside the cylinder element and the interior of the cover is in communication with the fluid which passes the piston element to provide an additional fluid reservoir.

12. A shock absorber according to claim 1 wherein said piston element comprises a main piston head on a hollow piston rod, a passage to the interior of the head from the fluid flow path past the piston, a second piston slidably disposed within the hollow piston rod and a recoil spring within the hollow rod urging the second piston towards the main piston head, so that in operation when fluid flows past the main piston head it will enter the hollow rod and displace the second piston therein to provide a reservoir for the fluid.

* * * * *